(12) United States Patent
Sheng et al.

(10) Patent No.: US 11,599,117 B2
(45) Date of Patent: Mar. 7, 2023

(54) SYSTEMS AND METHODS FOR OBSTACLE PROXIMITY DETECTION

(71) Applicant: Steering Solutions IP Holding Corporation, Saginaw, MI (US)

(72) Inventors: Jian Sheng, Madison Heights, MI (US); Tejas M. Varunjikar, Troy, MI (US); Zaki Ryne, Rochester Hills, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 196 days.

(21) Appl. No.: 16/796,012

(22) Filed: Feb. 20, 2020

(65) Prior Publication Data

US 2021/0263518 A1   Aug. 26, 2021

(51) Int. Cl.
| | | |
|---|---|---|
| *G05D 1/02* | (2020.01) | |
| *G01S 13/86* | (2006.01) | |
| *B62D 6/00* | (2006.01) | |
| *B60R 11/04* | (2006.01) | |
| *B60R 21/0134* | (2006.01) | |
| *G06K 9/00* | (2022.01) | |
| *G06V 20/58* | (2022.01) | |

(Continued)

(52) U.S. Cl.
CPC ............ *G05D 1/0214* (2013.01); *B60R 11/04* (2013.01); *B60R 21/0134* (2013.01); *B62D 6/00* (2013.01); *G01S 13/867* (2013.01); *G05D 1/0246* (2013.01); *G05D 1/0257* (2013.01); *G06V 20/58* (2022.01); *G06V 20/588* (2022.01); *G01S 2013/9318* (2020.01)

(58) Field of Classification Search
CPC .. G05D 1/0214; G05D 1/0246; G05D 1/0257; B60R 21/0134; B60R 11/04; B62D 6/00; G01S 13/867; G01S 2013/9318; G06V 20/588; G06V 20/58
See application file for complete search history.

(56) References Cited

U.S. PATENT DOCUMENTS 10,948,928 B2 *   3/2021  Van Der Knaap .... B60W 30/12
2002/0005778 A1 *   1/2002  Breed ..................... G01S 7/481
                                                                           340/435

(Continued)

FOREIGN PATENT DOCUMENTS

| CA | 3029124 A1 * | 1/2018 | ............. G01C 21/28 |
| EP | 3046049 A1 * | 7/2016 | ............... B60R 1/00 |

*Primary Examiner* — Peter D Nolan
*Assistant Examiner* — Demetra R Smith-Stewart
(74) *Attorney, Agent, or Firm* — Dickinson Wright PLLC (57) ABSTRACT

Embodiments for assisting steering of a vehicle responsive to detecting an object in a proximity of a vehicle are described. Embodiments described include: receiving an image of a lane indicator corresponding to a lane of travel of the vehicle from an image capturing device; determining, based on the image, reference values corresponding to a position of the lane indicator relative to the vehicle; associating each of the reference values to values used to locate a point within a reference frame related to a direction the vehicle is traveling; receiving position information of an object in an environment external to the vehicle from a radar sensor; determining, based on the values and the position information, an assigned lane of the object; detecting an impending change of the lane of travel of the vehicle to the assigned lane of the object; generating a steering control value based on the impending change.

20 Claims, 9 Drawing Sheets

(51) Int. Cl.
 *G06V 20/56* (2022.01)
 *G01S 13/931* (2020.01)

(56) References Cited

U.S. PATENT DOCUMENTS

| | | | |
|---|---|---|---|
| 2015/0166062 A1* | 6/2015 | Johnson | B60W 10/20 |
| | | | 701/41 |
| 2018/0134217 A1* | 5/2018 | Peterson | G08G 1/167 |
| 2018/0354555 A1 | 12/2018 | Sheng et al. | |
| 2019/0315345 A1* | 10/2019 | Newman | B60W 50/14 |
| 2020/0238904 A1* | 7/2020 | Kim | B60W 10/20 |
| 2020/0257301 A1* | 8/2020 | Weiser | G06N 3/02 |
| 2021/0108926 A1* | 4/2021 | Tran | G06N 3/04 |

* cited by examiner

SYSTEMS AND METHODS FOR OBSTACLE PROXIMITY DETECTION

TECHNICAL FIELD

This disclosure relates to vehicles and in particular to systems and methods for detecting obstacles in proximity of a vehicle.

BACKGROUND

Advances in occupant safety in vehicles have played a significant role in reducing the number of fatalities and injuries in the last few decades. Such advances include passive safety features (e.g., seat belt, airbag, chassis structure design etc.) as well as active safety features (e.g., Electronic Stability Control, Anti-lock Braking System, adaptive cruise, automatic braking system, and the like). The active safety features are crucial in avoiding a crash or mitigating the severity of a crash.

Typically, a vehicle is provided with various features for monitoring conditions of other moving vehicles proximate the vehicle. The features may enable the vehicle to detect the presence of other vehicles and obstacles. Such features may also may alert an operator of the vehicle or control vehicle maneuvers in response to various conditions of other vehicles or obstacles.

SUMMARY

This disclosure relates generally to systems and methods for detecting an obstacles in proximity of a vehicle. An aspect of the disclosed embodiments includes a remote object detection system of a vehicle. The remote object detection system comprises a processor and a memory. The memory includes instructions that, when executed by the processor, cause the processor to: receive an image of a lane indicator corresponding to a lane of travel of the vehicle from an image capturing device; determine, based on the image, reference values corresponding to a position of the lane indicator relative to the vehicle; associate each of the reference values to values used to locate a point within a reference frame related to a direction the vehicle is traveling; receive position information of an object in an environment external to the vehicle from a radar sensor; determine, based on the values and the position information, an assigned lane of the object; detect an impending change of the lane of travel of the vehicle to the assigned lane of the object; generate a steering control value based on the impending change; and selectively control steering of the vehicle based on the steering control value.

Another aspect of the disclosed embodiments includes a method for assisting steering of a vehicle in response to detecting an object in a proximity of a vehicle. The method includes receiving an image of a lane indicator corresponding to a lane of travel of the vehicle from an image capturing device. The method also includes determining, based on the image, reference values corresponding to a position of the lane indicator relative to the vehicle. The method also includes associating each of the reference values to values used to locate a point within a reference frame related to a direction the vehicle is traveling. The method also includes receiving position information of an object in an environment external to the vehicle from a radar sensor. The method also includes determining, based on the values and the position information, an assigned lane of the object; detecting an impending change of the lane of travel of the vehicle to the assigned lane of the object. The method also includes generating a steering control value based on the impending change. The method also includes selectively controlling steering of the vehicle based on the steering control value.

Another aspect of the disclosed embodiments includes a remote object detection system of a vehicle. The remote object detection system includes a radar sensor and an image capturing device. The radar sensor is configured to detect an object in an environment external to the vehicle. The image capturing device is configured to capture an image representing an environment within a field of view of the image capturing device. The remote object detection system also includes a processor; and a memory. The memory includes instructions that, when executed by the processor, cause the processor to: receive, from the image capturing device, the image, wherein the image is of a lane indicator corresponding to a lane of travel of the vehicle; determine, based on the image, reference values corresponding to a position of the lane indicator relative to the vehicle; associate each of the reference values to values used to locate a point within a reference frame related to a direction the vehicle is traveling; receive, from the radar sensor, position information of the object; determine, based on the values and the position information, an assigned lane of the object; detect an impending change of the lane of travel of the vehicle to the assigned lane of the object; generate a steering control value based on the impending change; and selectively control steering of the vehicle based on the steering control value.

These and other aspects of the present disclosure are disclosed in the following detailed description of the embodiments, the appended claims, and the accompanying figures.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Advances in occupant safety in vehicles have played a significant role in reducing the number of fatalities and injuries in the last few decades. Such advances include passive safety features (e.g., seat belt, airbag, chassis structure design etc.) as well as active safety features (e.g., Electronic Stability Control, Anti-lock Braking System, adaptive cruise, automatic braking system, and the like). The active safety features are crucial in avoiding a crash or mitigating the severity of a crash.

Typically, a vehicle is provided with various features for monitoring conditions of other moving vehicles proximate the vehicle. The features may enable the vehicle to detect the presence of other vehicles and obstacles. Such features may also may alert an operator of the vehicle or control vehicle maneuvers in response to various conditions of other vehicles or obstacles.

While such features provide the operator with more safety and improved functionality, a persistent peril for the operator is the potential for collisions with obstacles on a blind spot of a vehicle, an area around the vehicle that the operator cannot directly observe. In conventional technologies, challenges persist in reliably detecting vehicles and/or objects in a proximity of a vehicle. One particular challenge is an assignment of a detected object to a particular adjacent lane.

Systems and methods described herein may be configured to address the problems described above by assisting steering of a vehicle in response to detecting an object in a proximity of a vehicle. For example, an image is received of a lane indicator corresponding to a lane of travel of the vehicle from an image capturing device and reference values are determined based on the image. The reference values correspond to a position of the lane indicator relative to the vehicle and each of the reference values is associated to values used to locate a point within a reference frame related to a direction the vehicle is traveling. Position information of an object in an environment external to the vehicle is also received from a radar sensor and an assigned lane of the object is determined based on the values and the position information. Additionally, an impending change of the lane of travel of the vehicle to the assigned lane of the object is detected, a steering control value is generated based on the impending change, and steering of the vehicle is selectively controlled based on the steering control value.

Figure 1:
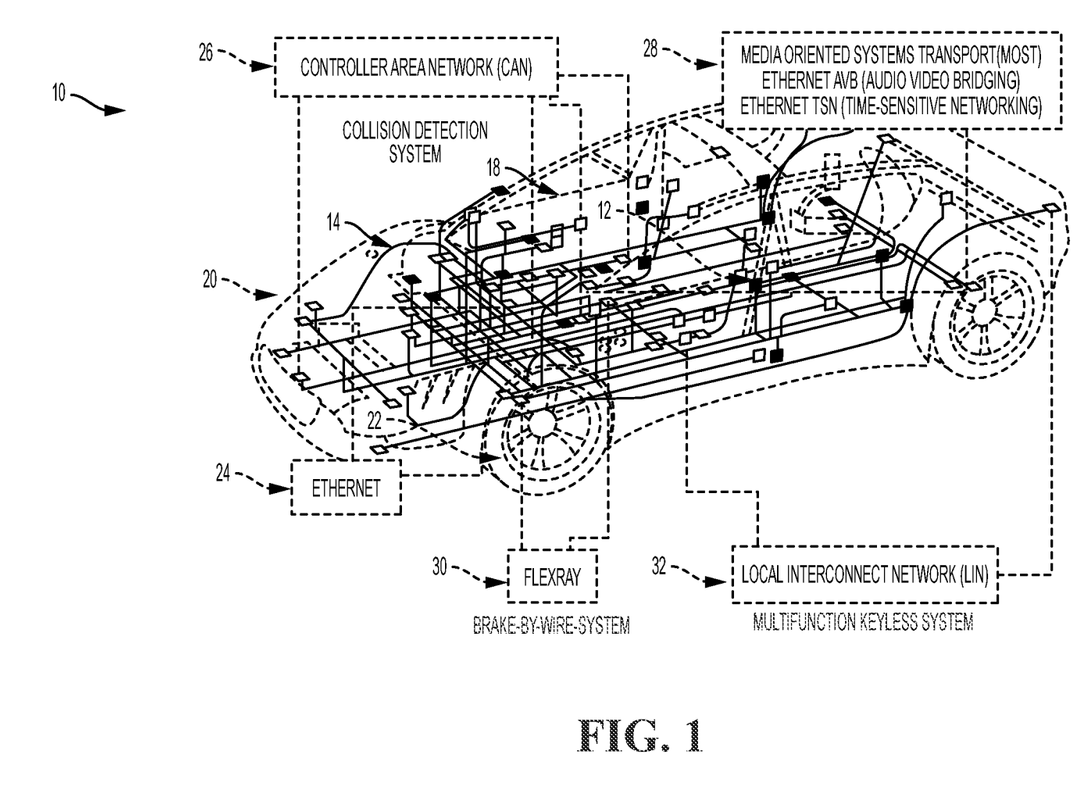
FIG. 1 generally illustrates a vehicle according to the principles of the present disclosure.

To explore the foregoing in further detail, FIG. 1 will now be described. FIG. 1 generally illustrates a vehicle 10 according to the principles of the present disclosure. The vehicle 10 may include any suitable vehicle, such as a car, a truck, a sport utility vehicle, a mini-van, a crossover, any other passenger vehicle, any suitable commercial vehicle, or any other suitable vehicle. While the vehicle 10 is illustrated as a passenger vehicle having wheels and for use on roads, the principles of the present disclosure may apply to other vehicles, such as planes, boats, trains, drones, or other suitable vehicles.

The vehicle 10 includes a vehicle body 12 and a hood 14. A passenger compartment 18 is at least partially defined by the vehicle body 12. Another portion of the vehicle body 12 defines an engine compartment 20. The hood 14 may be moveably attached to a portion of the vehicle body 12, such that the hood 14 provides access to the engine compartment 20 when the hood 14 is in a first or open position and the hood 14 covers the engine compartment 20 when the hood 14 is in a second or closed position. In some embodiments, the engine compartment 20 may be disposed on rearward portion of the vehicle 10 than is generally illustrated.

The passenger compartment 18 may be disposed rearward of the engine compartment 20, but may be disposed forward of the engine compartment 20 in embodiments where the engine compartment 20 is disposed on the rearward portion of the vehicle 10. The vehicle 10 may include any suitable propulsion system including an internal combustion engine, one or more electric motors (e.g., an electric vehicle), one or more fuel cells, a hybrid (e.g., a hybrid vehicle) propulsion system comprising a combination of an internal combustion engine, one or more electric motors, and/or any other suitable propulsion system.

In some embodiments, the vehicle 10 may include a petrol or gasoline fuel engine, such as a spark ignition engine. In some embodiments, the vehicle 10 may include a diesel fuel engine, such as a compression ignition engine. The engine compartment 20 houses and/or encloses at least some components of the propulsion system of the vehicle 10. Additionally, or alternatively, propulsion controls, such as an accelerator actuator (e.g., an accelerator pedal), a brake actuator (e.g., a brake pedal), a steering wheel, and other such components are disposed in the passenger compartment 18 of the vehicle 10. The propulsion controls may be actuated or controlled by a driver of the vehicle 10 and may be directly connected to corresponding components of the propulsion system, such as a throttle, a brake, a vehicle axle, a vehicle transmission, and the like, respectively. In some embodiments, the propulsion controls may communicate signals to a vehicle computer (e.g., drive by wire) which in turn may control the corresponding propulsion component of the propulsion system. As such, in some embodiments, the vehicle 10 may be an autonomous vehicle.

In some embodiments, the vehicle 10 includes a transmission in communication with a crankshaft via a flywheel or clutch or fluid coupling. In some embodiments, the transmission includes a manual transmission. In some embodiments, the transmission includes an automatic transmission. The vehicle 10 may include one or more pistons, in the case of an internal combustion engine or a hybrid vehicle, which cooperatively operate with the crankshaft to generate force, which is translated through the transmission to one or more axles, which turns wheels 22. When the vehicle 10 includes one or more electric motors, a vehicle battery, and/or fuel cell provides energy to the electric motors to turn the wheels 22.

The vehicle 10 may include automatic vehicle propulsion systems, such as a cruise control, an adaptive cruise control, automatic braking control, other automatic vehicle propulsion systems, or a combination thereof. The vehicle 10 may be an autonomous or semi-autonomous vehicle, or other suitable type of vehicle. The vehicle 10 may include additional or fewer features than those generally illustrated and/or disclosed herein.

In some embodiments, the vehicle 10 may include an Ethernet component 24, a controller area network component (CAN) 26, a media oriented systems transport component (MOST) 28, a FlexRay component 30 (e.g., brake-by-wire system, and the like), and a local interconnect network component (LIN) 32. In some embodiments, the vehicle 10 is configured for domain control with over-the-air programming support. For example, as described, the vehicle 10 may receive updates for any suitable software component of the vehicle 10, via the Internet (e.g., or other suitable network).

The vehicle 10 may update or change software components based on the update. The vehicle 10 may include additional or fewer features than those generally illustrated and/or disclosed herein.

In some embodiments, the vehicle 10 include one or more radar sensors that provide position information corresponding to objects detected in the proximity of the vehicle 10. For example, the one or more radar sensors may provide speed and location information of a detected object relative the vehicle 10. The position information and at least one image of a lane indicator corresponding to a lane of travel of the vehicle 10 captured by an image capturing device can be used to determine a lane of travel (e.g., same, left, right, etc.,) of a detected object behind or on the side of the vehicle 10.

Figure 2:
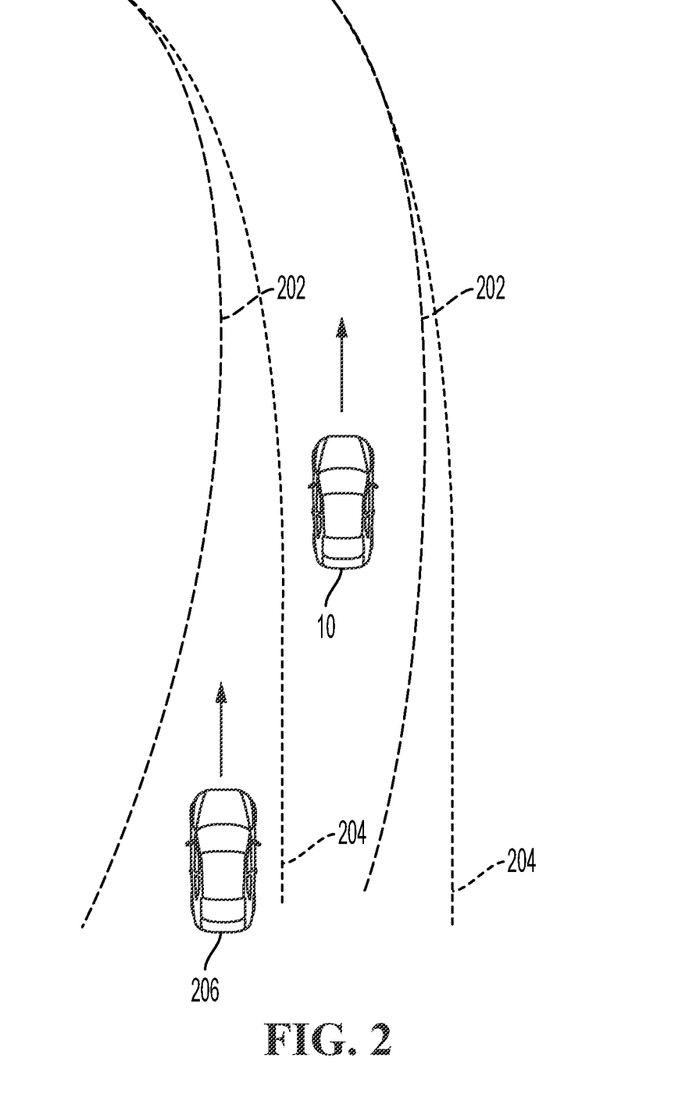
FIG. 2 generally illustrates scenario of using a lane indicator position in front of a vehicle on a curved road to extrapolate a position of a lane indicator behind the vehicle according to the principles of the present disclosure.

For example, a rear facing camera could be used to achieve this objective. However, this adds additional costs if the vehicle 10 already utilizes a forward facing camera. Images captured from the forward facing camera can be used to determine a position of a lane indicator behind and/or on the side of the vehicle 10, but images captured contemporaneously as the vehicle 10 traverses forward cannot be used to extrapolate the position of the lane indicator behind and/or on the side of the vehicle 10. Any data from these images used to extrapolate positioning of the lane indicator may cause the positioning of the lane indicator to be inaccurately portrayed (particularly on a curved road). FIG. 2 provides an example of using a lane indicator position in front of the vehicle 10 on a curved road to extrapolate the position of the lane indicator behind and/or on the side of the vehicle 10. As is generally illustrated in FIG. 2, if a position of lane indicators 204 in front of the vehicle 10 are used to extrapolate the positioning of lane indicators behind the vehicle 10, then the positioning of the lane indicators behind and/or on the side of vehicle 10 is determined to be curved (as represented by lane indicators 202). As such, based on the extrapolated positioning of the lane indicators 202, a vehicle 206 will be determined to be in the same lane as the vehicle 10 and not in a lane adjacent to the vehicle 10.

Figure 3:
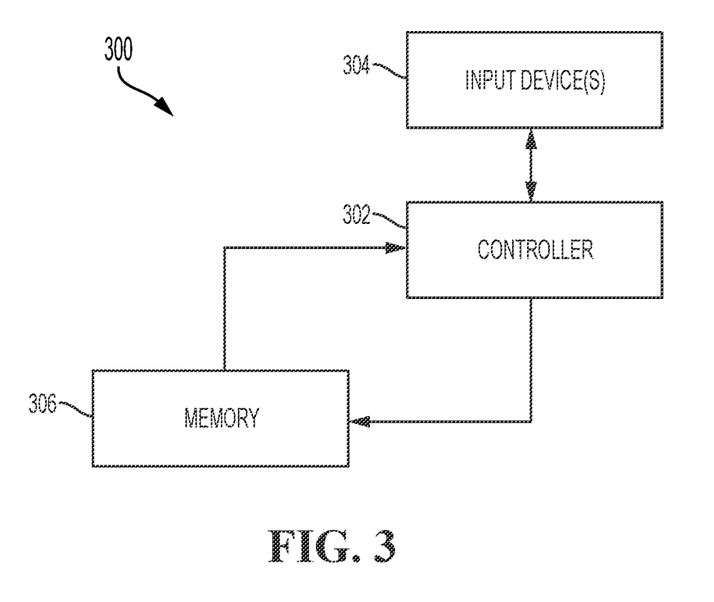
FIG. 3 generally illustrates a remote object detection system according to the principles of the present disclosure.

To prevent this, the vehicle 10 may include a remote object detection system 300 as is generally illustrated in FIG. 3. The system 300 may be configured to assist an operator of the vehicle 10 in determining a lane of travel of an object detected in the proximity of the vehicle 10 and selectively control steering of the vehicle 10 in response to detect an impending change of a lane of travel of the vehicle 10 to the assigned lane of the object. As is generally illustrated in FIG. 3, the system 300 may include a controller 302, one or more input devices 304, and a memory 306. The controller 302 may include any suitable controller, such as a vehicle electronic control unit, a processor, or any other suitable controller, such as those described herein.

The controller 302 may be in communication with the memory 306. The memory 306 may include any suitable non-volatile or volatile memory. The memory 306 may include a memory array, a memory storage device, or any other suitable memory. The memory 306 may include instructions that, when executed by the controller 302, cause the controller 302 to, at least, control steering of the vehicle 10. Additionally, or alternatively, the instructions, when executed by the controller 302, may cause the controller 302 to perform various other functions of the vehicle 10. The controller 302 may be further configured to receive input from the input devices 304.

The input devices 304 may include any suitable input device or a plurality of suitable input devices. For example, the input devices 304 may include an image-capturing device (e.g., a camera or other suitable image-capturing device), a radar sensor, a LIDAR sensor, a global positioning system (GPS) sensor, a sonar sensor, other suitable sensors, or a combination thereof. More specifically, in some embodiments, the input devices 304 may include view image-capturing device (e.g., a forward facing camera) that captures images of external environments of the vehicle 10 within a field of view of the image-capturing device. The field of vision may include a portion of the environment external to the vehicle 10 that is within the travel path of the vehicle 10. The controller 302 is configured to process this image data and/or other types of data collected by the input devices 304. Additionally, or alternatively, the controller 302 may use a convolutional neural network described herein to detect the one or more lane indicators.

In some embodiments, the controller 302 is configured to receive data (e.g., image of a lane indicator) indicating a position of a lane indicator relative to the vehicle 10 from the input devices 304, analyze the data to determine reference values corresponding to a position of the lane indicator relative to the vehicle, and store the reference values in the memory 306. Inputs from the input devices 304 may indicate a position of a left lane indicator and a right lane indicator relative to the vehicle 10. In some embodiments, the controller 302 may analyze the inputs to determine reference values that represent an offset or a distance of a left lane indicator and a right lane indicator from the vehicle 10 (e.g., from the center or edges of the vehicle 10). In some embodiments, the controller 302 may store the reference values (e.g., 150 or more reference values) in an array in the memory 306.

In some embodiments, the controller 302 is further configured to associate each of the reference values to values used to locate a point within a reference frame related to a direction (e.g., a heading angle of the vehicle 10) the vehicle 10 is traveling. For example, as described above, the controller 302 may determine reference values corresponding to a position of the lane indicator relative to the vehicle 10. The controller 302 may then associate each of the reference values to the values used to locate a point within a reference frame related to a direction the vehicle 10 is traveling using coordinate transformation. In some embodiments, the reference points may be iteratively associated to the values within the reference frame.

Figure 4:
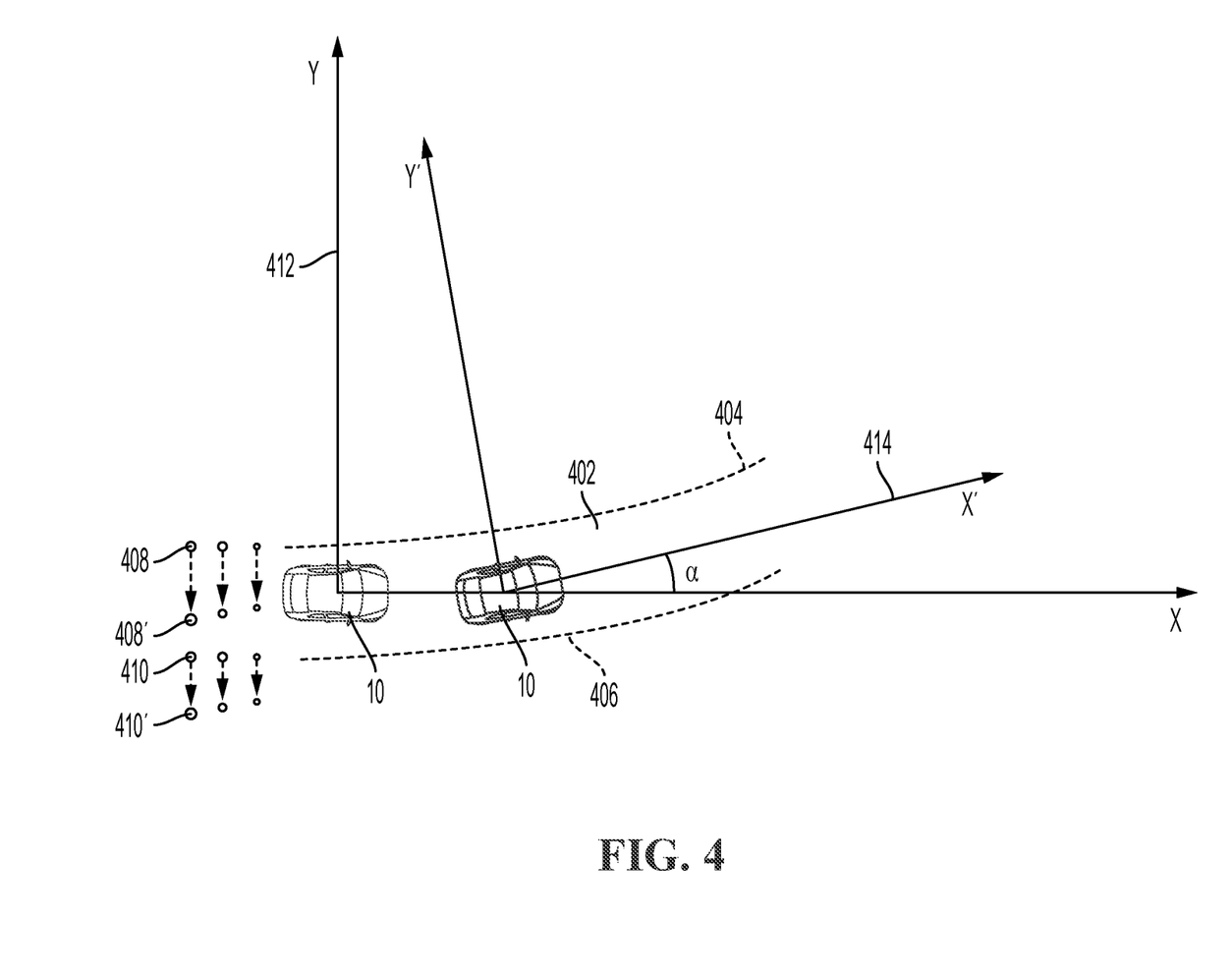
FIG. 4 generally illustrates a point on a lane indicator within a reference frame of vehicle according to the principles of the present disclosure.

To help further illustrate, FIG. 4 will now be described. FIG. 4 depicts how to associate reference values to values used to locate a point within a reference frame related to a direction the vehicle 10 is traveling. For example, as is generally illustrated in FIG. 4, as the vehicle 10 moves forward in a lane 402, the controller 302 may receive image data captured from a forward facing camera of the input devices 304. The controller 302 may analyze the image data to determine reference values corresponding to a position of a right lane indicator 406 and a position of a left lane indicator 404 relative to the vehicle 10 at several instances of time. In accordance with this example, the controller 302 may be represent the reference values as points 408 (representing positioning of the left lane indicator 404) and points 410 (representing positioning of the right lane indicator 406) within a reference frame or coordinate system 412 where a center of the vehicle 10 serves as an origin. Points 408 and points 410 may uniquely identify the position of the right lane indicator 406 and the left lane indicator 404 within the coordinate system 412.

The controller 302 may then transform the points 408 and the points 410 to account for a direction the vehicle 10 is traveling. For example, the points 408 and the points 410 within the reference frame 414 may be transformed to a reference frame 414 related to the heading angle (α). The points 408 and the points 410 may be represented in the reference frame 414 as points 408' and points 410', respectively. For example, in some embodiments, the relationships between the points 408 and the points 408' and the points 410 and the points 410' may be represented by the following matrix:

$$\begin{bmatrix} X' \\ Y' \\ 1 \end{bmatrix} = \begin{bmatrix} \cos(\alpha) & -\sin(\alpha) & h \\ \sin(\alpha) & \cos(\alpha) & k \\ 0 & 0 & 1 \end{bmatrix} \begin{bmatrix} X \\ Y \\ 1 \end{bmatrix}$$

where X=0, Y=a lane indicator offset from the vehicle, h=−(Vehicle Speed)*dt, k=0, and α=−(Yaw Rate)*dt Furthermore, in some embodiments, the input devices 304 generally illustrated in FIG. 3 may be configured to measure various characteristics of the vehicle 10 and/or an environment external to the vehicle 10. The input devices 304 may communicate the measured characteristics to the controller 302. For example, vehicle and steering signals can include measurement signals received from the one or more sensors or can include estimated or computed signals from one or more processors in the vehicle 10. The vehicle and steering signals may include a yaw rate, a vehicle speed, a vehicle acceleration, a steering angle, an input torque applied to a handwheel of the vehicle 10, etc. The controller 302 may use the vehicle and steering signals (such as yaw rate and vehicle speed) to associate the points 408 and the points 408' and the points 410 and the points 410'. In some embodiments, the points 408' and the points 410' may be stored in the memory 306 of FIG. 3.

In some embodiments, as described, the input devices 304 may also include one or more radar sensors. The controller 302 may receive from the one or more sensors position information corresponding to objects detected in the proximity of the vehicle 10. For example, the input devices 304 (e.g., rear corner radars of the vehicle 10) may detect an object (e.g., the vehicle 206 of FIG. 2) in the proximity of the vehicle 10 (e.g., in the blind spot of the vehicle 10) and provide inputs to the controller 302 indicating position information corresponding to the object detected in the proximity of the vehicle 10.

Further, the controller 302 may be configured to determine, based on the points 408' and the points 410' stored in the memory 306 and the position information, a lane of travel (e.g., right, left, same lane as the vehicle 10 etc.,) of the object. In some embodiments, the object could include stationary objects in a lane adjacent to the vehicle 10 including traffic cones/markers, pedestrians, walls, road dividers, or any other such objects that the vehicle 10 can collide with.

Figure 5:
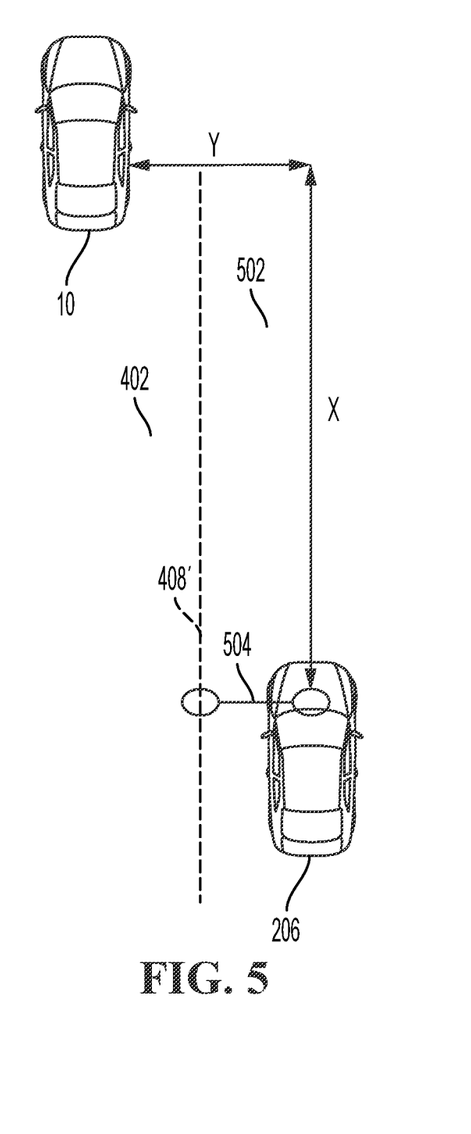
FIG. 5 generally illustrates a vehicle lane designation assignment according to the principles of the present disclosure.

To help further illustrate, FIG. 5 will now be described. As is generally illustrated in FIG. 5, the vehicle 206 is behind the vehicle 10 in an adjacent lane 502. The points 408' of FIG. 4 represent the position of the right lane indicator relative to the vehicle 10 in the lane 402. The controller 302 may receive position information corresponding to the vehicle 206 and analyze the position information to determine that a point on a front of the vehicle 206 is located a Y distance away from a side of the vehicle 10 in a lateral direction and that the point on the front of the vehicle 206 is located an X distance away behind the vehicle 10.

The controller 302 may be further configured to determine a proximity of the vehicle 206 to a lane indicator represented by the points 408'. The controller 302 may compare the X distance to the X' values of points 408' to approximate where the vehicle 206 is located behind the vehicle 10 in relation to the lane indicator represented by the points 408'. For example, the closest X' value in the points 408' to X may indicate a minimum distance that the vehicle 206 is located behind the vehicle 10. The controller 302 may further compare the Y distance to the Y' values of the points 408' to determine a distance 504 between the vehicle 206 and the lane indicator represented by the points 408'. Based on the distance 504, the controller 302 may determine a lane of travel of the vehicle 206. For example, in the instance that Y is larger than the distance 504, then the controller 302 could assign a flag to the vehicle 206 designating that the vehicle 206 is in an adjacent lane (e.g., as in this case, a "right" lane designation to the vehicle 206). In contrast, in the instance that Y is smaller than the distance 504, then the controller 302 could assign a flag to the vehicle 206 designating that the vehicle 206 is in the same lane as the vehicle 10.

In some embodiments, the controller 302 may be configured detect an impending change of the lane of travel of the vehicle 10 to the assigned lane of the object, as is generally illustrated in FIG. 3. For example, the controller 302 may determine a steering direction of the vehicle 10 using a measured angular position of the steering mechanism. The steering direction of the vehicle 10 may include a direction (e.g., left or right) from a perspective of the operator. The steering direction indicates a direction to change lanes.

In some embodiments, the operator of the vehicle 10 may indicate a direction to change lanes by actuating a turn signal of the vehicle to a first position (e.g., indicating a first side of the vehicle 10) or to a second position (e.g., indicating an opposite side of the vehicle 10). The controller 302 may be configured to receive an input indicating the position of the turn signal. For example, the controller 302 may receive an input indicating that the turn signal is in the first position, which may represent an impending change of the lane of travel of the vehicle 10 to a right adjacent lane of travel. Conversely, the input may indicate that the turn signal is in the second position, which may represent an impending change of the lane of travel of the vehicle 10 to a left adjacent lane of travel. These impending lane change detection techniques can be implemented in autonomous vehicles and in vehicles operated by an operator.

In some embodiments, the controller 302 may receive input from a driver monitoring system that measures various characteristics of an environment internal to (e.g., in the cabin) of the vehicle 10. The driver monitoring system may include one or more image-capturing devices, such as a camera, a passive infrared sensor, or a wearable that tracks the movement of the operator. The driver monitoring system captures image data of the operator. The controller 302 may use the image data to detect an impending change of the lane of travel of the vehicle 10. For example, the controller 302 may receive image data of a positioning of a turn signal from the driver monitoring system. In some situations the operator may not use the turn signal (e.g., because the vehicle 10 does not have one, because it is more cumbersome to use the turn signal, and the like). In some embodiments, because the driver monitoring system may use a convolutional neural network that is trained to determine where the operator is looking. The controller 302 may be configured to determine the intention of an operator to change lanes of travel based on the determination of where the driver is looking. Additionally, or alternatively, the driver monitoring system may track additional indications (e.g., a head pose or movement of the operator, gaze vector, and the like) that the controller 302 may use to determine that the operator intends to change lanes of the vehicle 10.

In some embodiments, the controller 302 is further configured to generate a steering control value based on the impending change. For example, if the controller 302 determines impending lane of travel change, the controller 302 may calculate a time to collision (TTC) between the vehicle 10 and the object and selectively control steering of the vehicle 10 based on the calculation.

Figure 6:
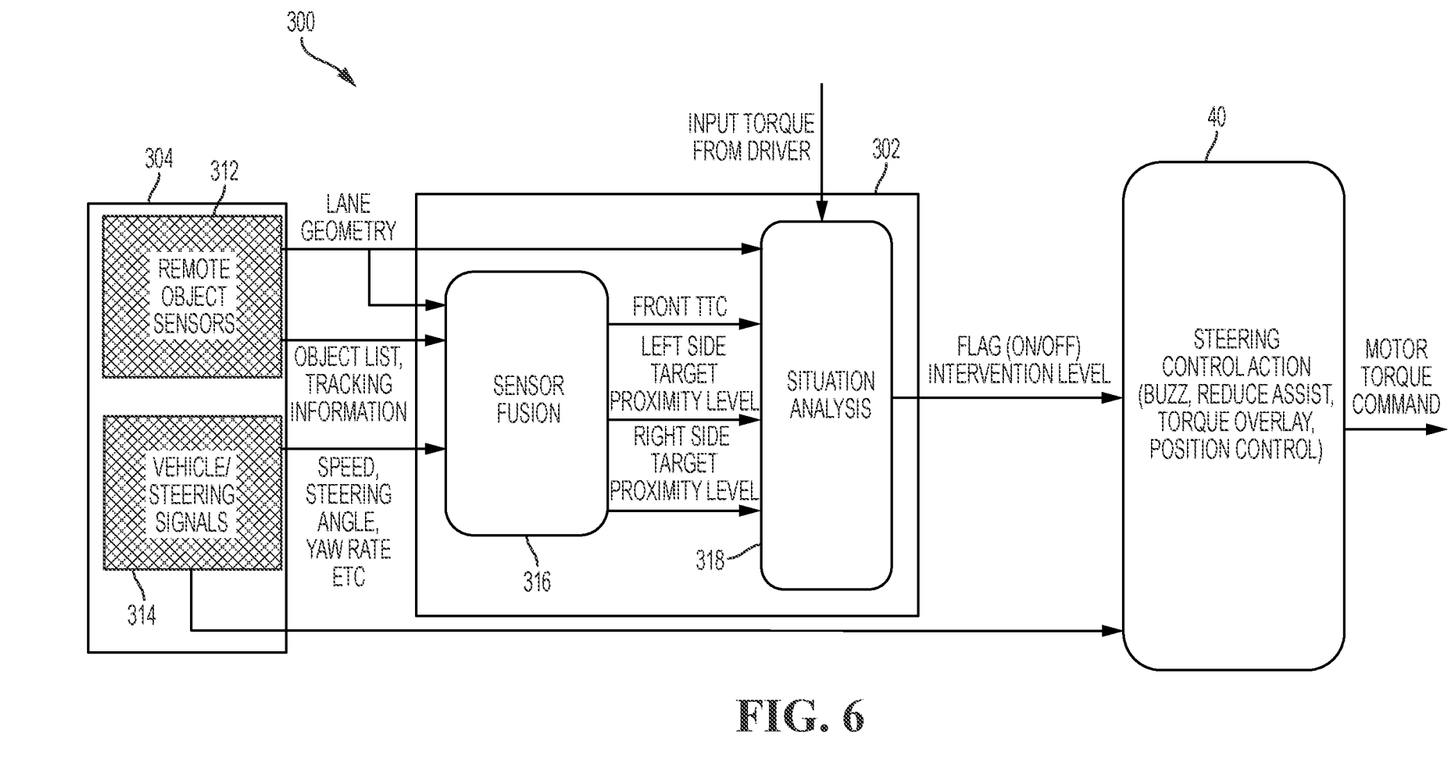
FIGS. 6-8 generally illustrate a remote object detection system according to the principles of the present disclosure.

FIG. 6 generally illustrates another exemplary embodiment of the remote object detection system 300 (e.g., as is generally illustrated in FIG. 3). As is generally illustrated in FIG. 6, the controller 302 is configured to communicate with a steering system 40 that generates an assist torque. In some embodiments, the controller 302 is a 'blind zone' assist system that detects remote objects in a blind zone of the vehicle 10.

In some embodiments, the controller 302 is part of a steering system, for example the steering system 40 performing the one or more operations based on output signals from the one or more sensors 312. Alternatively, or in addition, the controller 302 is a separate processing unit, such as an electronic circuit unit (ECU). In some embodiments, the controller 302 includes one or more computer executable instructions that are read and executed by a processing unit.

The controller 302 may use one or more sensors 312 such as camera, radar, LIDAR, ultrasonic sensor, etc. that the vehicle 10 is equipped with. Other sensors such as a GPS can be used in addition. In addition, vehicle and steering signals 314 are also provide input to the controller 302. The vehicle and steering signals 314 can include measurement signals received from the one or more sensors 312, such as those in the steering system 40, or can include estimated or computed signals from one or more ECUs in the vehicle 10. The vehicle and steering signals 314 can include a yaw rate, a vehicle speed, a vehicle acceleration, a steering angle, an input torque applied to a handwheel etc. The vehicle and steering signals 314 and the one or more sensors 312 are exemplary embodiments of the inputs devices 304 of FIG. 3.

As is generally illustrated in FIG. 6, the controller 302 may include a sensor fusion system 316 and a situation analysis system 318. In some embodiments, a logical combination of two or more sensors 312 can be used by the sensor fusion system 316. The sensor fusion system 316 is responsible for receiving the input signals from the sensors 312 and other vehicle/steering signals 314 and processing the input signals using one or more sensor fusion techniques. Sensor fusion system 316 facilitates combining the sensory data or data derived from the disparate sources, the sensors 312 and vehicle/steering signals 314, such that the resulting information has less uncertainty than using the sources individually.

The sensor fusion system 316, using the input signals, monitors the surroundings of the vehicle 10 within a predetermined proximity, such as up to a predetermined distance from the vehicle 10. The sensor fusion system 316 detects one or more remote objects in the surroundings and analyzes if a potential collision of the vehicle 10 with the detected remote objects is possible. The detected remote objects can include other vehicles (remote vehicle or target vehicle), traffic cones/markers, lane markers, pedestrians, walls, road dividers, or any other such objects that the vehicle 10 can collide with.

The sensor fusion system 316 computes TTC with a remote object that is detected using the input signals and one or more known techniques. For example, the sensor fusion system 316 computes a distance and a speed of a remote vehicle proximate or forward of the vehicle 10 or within the same lane of the vehicle 10. The sensor fusion system 316 can also compute a distance and a speed of an incoming vehicle in an adjacent lane to the vehicle 10. For example, the remote object detection system 300 provides blind zone assistance via the steering system 40. In some embodiments, the sensor fusion system 316 sends a front TTC signal to the situation analysis system 318 for determining what steering action (e.g., buzz, reduce assist, torque overlay, position control) can be taken. The front TTC signal indicates a TTC with a target vehicle that is in front of the vehicle 10.

Figure 7:
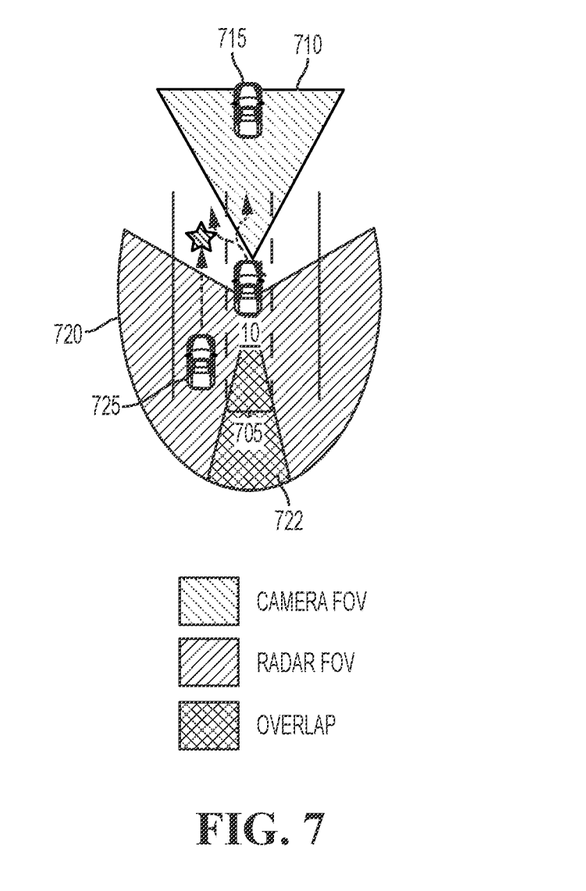

FIG. 7 depicts an example scenario where the remote object detection system 300 provides steering assistance according to one or more embodiments. It should be noted that the case depicted is an example, and that the technical solutions herein can be implemented in other scenarios as well. The scenario of FIG. 7 depicts the controller 302 using one or more input signals for data from a forward facing camera and two rear corner radar sensors. As illustrated, a first region 710 represents the camera's field of view (FOV), a second region 720 represents a radar sensor's field of view, and a third region 722 represents an overlap area between two (or more) radar sensors.

Referring to FIG. 6, for example, in the second region 720 of the vehicle 10, radar signals are used to keep tracking target 725 that is proximate to the vehicle 10. Steering signals 314 and lane indicators of a lane 705 are also used to predict a lane-change status of the vehicle 10. The lane-change status indicates if the vehicle 10 is intending to perform a lane change maneuver (left lane change, right lane change, etc.) or continue traveling in the lane 705.

The situation analysis system 318, which uses the lane-change status, front time-to-collision, and side time-to-collision to determine whether to trigger one or more levels of steering intervention. For example, if there is an impending front collision, determined based on the front time-to-collision, the side-collision prevention function is switched OFF using the flag provided to the steering system 40. Alternatively, or in addition, depending on the side time-to-collision, a steering intervention is triggered to prevent a side collision. The steering intervention can include scaling the assist torque generated based on driver input torque, the scaling factor for the scaling based on the analysis of the situation analysis system 318. Alternatively, or in addition, the steering intervention can include generating an overlay torque to oppose or further assist the input torque from the driver. For example, the steering system 40 determines the one or more levels of steering interventions.

Figure 8:
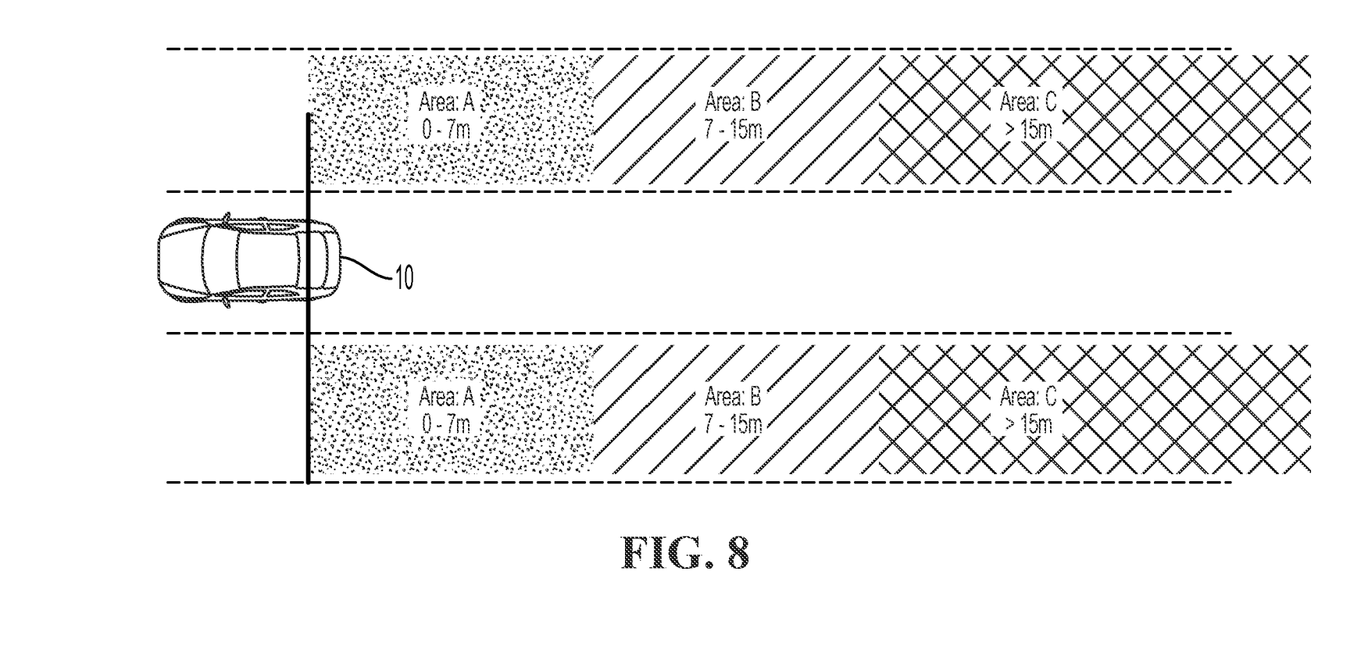

As described, a TTC is calculated based on object proximity and relative velocity. Additionally, in some embodiments, steering action taken to control steering of the vehicle 10 is taken based on the TTC and an intention to change lanes. For example, depending on a proximity of the object to the vehicle 10 a more intrusive steering action may need to be taken. With reference to FIG. 8, an object detected in an area A may prompt a steering intervention that includes generating an overlay torque to oppose or further assist the input torque from the driver. In contrast, an object detected in an area C may not trigger a steering intervention but cause a warning to be provided to an operator of the vehicle 10.

Moreover, in order to prevent false alarms, a radar sensor of the vehicle 10 may track a number of times a signal is returned from an area in a predetermined distance of the vehicle. For example, the radar sensor may count the number of times a signal bounces back from the area within the predetermined distance. The controller 302 may then generate the steering control value based on the number of times the signal is returned and the predetermined distance. For example, if the number of times a signal is returned is below a threshold (e.g., twenty five times the signal is returned), the controller 302 may generate a steering control value that indicates not to interfere with steering of the vehicle 10, as the detected object may no longer be within the predetermined distance. In contrast, if the number of times a signal is returned is above the threshold, the controller 302 may generate a steering control value that indicates intervening in the steering of the vehicle 10 and depending on which area within the predetermined distance that the detected object is, the control of the steering of the vehicle 10 may be more or less intrusive.

Figure 9:
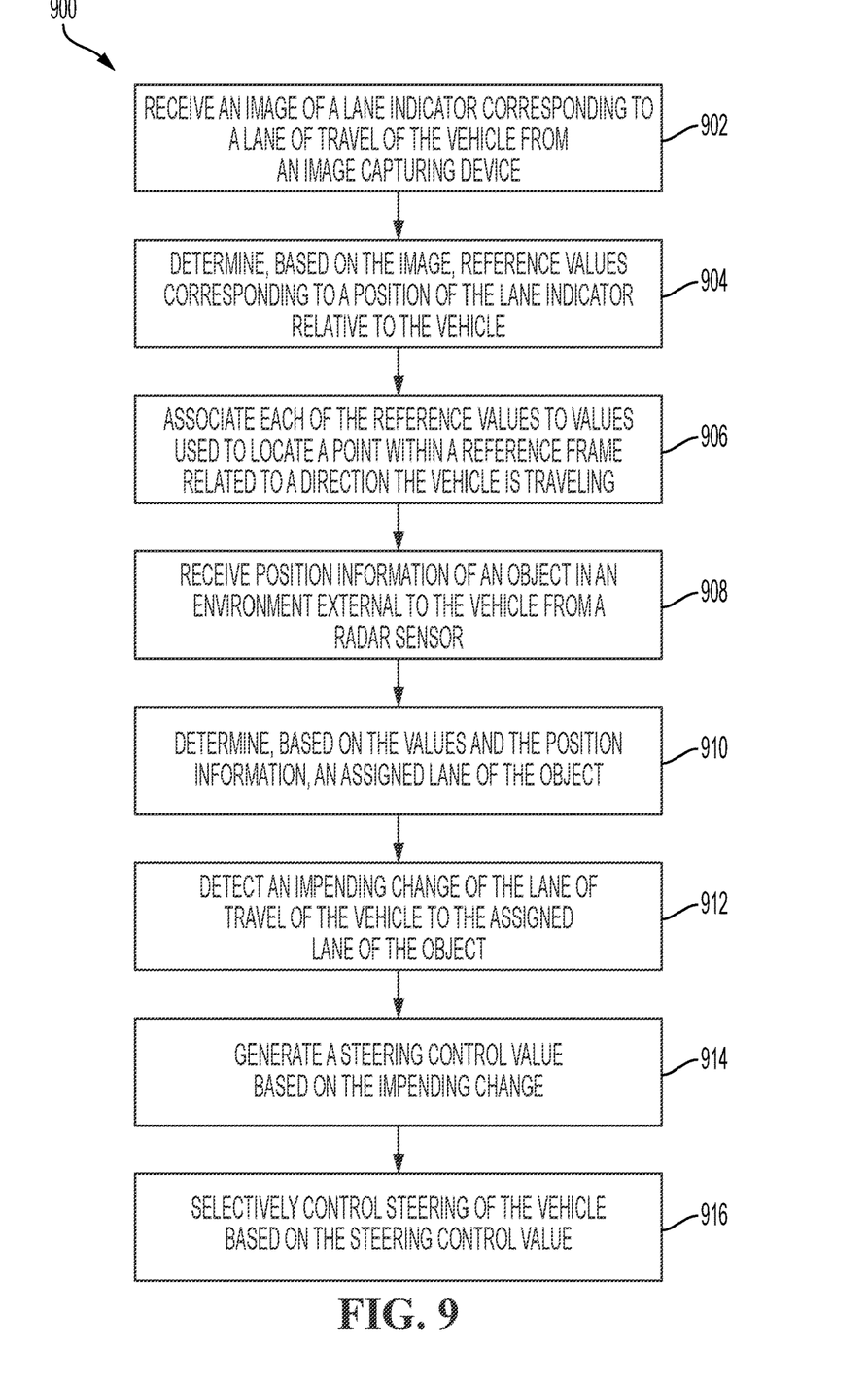
FIG. 9 is a flow diagram generally illustrating a remote object detection method according to the principles of the present disclosure.

FIG. 9 is a flow diagram generally illustrating a method 900 for providing remote object assist according to the principles of the present disclosure. At 902, the method 900 receives an image of a lane indicator corresponding to a lane of travel of the vehicle from an image capturing device. For example, the controller 302 of FIG. 3 and FIG. 6 receives an image of a lane indicator corresponding to a lane of travel of the vehicle from an image capturing device.

At 904, the method 900 determines, based on the image, reference values corresponding to a position of the lane indicator relative to the vehicle. For example, the controller 302 of FIG. 3 and FIG. 6 determines, based on the image, reference values corresponding to a position of the lane indicator relative to the vehicle.

At 906, the method 900 associates each of the reference values to values used to locate a point within a reference frame related to a direction the vehicle is traveling. For example, the controller 302 of FIG. 3 and FIG. 6 associates each of the reference values to values used to locate a point within a reference frame related to a direction the vehicle is traveling.

At 908, the method 900 receives position information of an object in an environment external to the vehicle from a radar sensor. For example, the controller 302 of FIG. 3 and FIG. 6 receives position information of an object in an environment external to the vehicle from a radar sensor.

At 910, the method 900 determines, based on the values and the position information, an assigned lane of the object. For example, the controller 302 of FIG. 3 and FIG. 6 determines, based on the values and the position information, an assigned lane of the object.

At 912, the method 900 detects an impending change of the lane of travel of the vehicle to the lane of travel of the object. For example, the controller 302 of FIG. 3 and FIG. 6 detects an impending change of the lane of travel of the vehicle to the lane of travel of the object.

At 914, the method 900 generates a steering control value based on the impending change. For example, the controller 302 of FIG. 3 and FIG. 6 generates a steering control value based on the impending change.

At 916, the method 900 selectively control steering of the vehicle based on the steering control value. For example, the controller 302 of FIG. 3 and FIG. 6 selectively control steering of the vehicle based on the steering control value.

In some embodiments, a remote object detection system of a vehicle, comprising: a processor; and a memory that includes instructions that, when executed by the processor, cause the processor to: receive an image of a lane indicator corresponding to a lane of travel of the vehicle from an image capturing device; determine, based on the image, reference values corresponding to a position of the lane indicator relative to the vehicle; associate each of the reference values to values used to locate a point within a reference frame related to a direction the vehicle is traveling; receive position information of an object in an environment external to the vehicle from a radar sensor; determine, based on the values and the position information, an assigned lane of the object; detect an impending change of the lane of travel of the vehicle to the assigned lane of the object; generate a steering control value based on the impending change; and selectively control steering of the vehicle based on the steering control value.

In some embodiments, the instructions further cause the processor to associate each of the reference values to the values using coordinate transformation.

In some embodiments, the instructions further cause the processor to determine, based on the image, reference values corresponding to a position of another lane indicator relative to the vehicle.

In some embodiments, the instructions further cause the processor to determine a proximity of the object to the lane indicator based on the values and the position information.

In some embodiments, the object is in a blind spot of the vehicle.

In some embodiments, the image represents a portion of the environment external to the vehicle that is within a field of view of the image capturing device and the position information indicates that the object is in a blind spot of the vehicle.

In some embodiments, the image is of a front view of the vehicle.

In some embodiments, a method for assisting steering of a vehicle in response to detecting an object in a proximity of a vehicle, comprising: receiving an image of a lane indicator corresponding to a lane of travel of the vehicle from an image capturing device; determining, based on the image, reference values corresponding to a position of the lane indicator relative to the vehicle; associating each of the reference values to values used to locate a point within a reference frame related to a direction the vehicle is traveling; receiving position information of an object in an environment external to the vehicle from a radar sensor; determining, based on the values and the position information, an assigned lane of the object; detecting an impending change of the lane of travel of the vehicle to the assigned lane of the object; generating a steering control value based on the impending change; and selectively controlling steering of the vehicle based on the steering control value.

In some embodiments, the associating each of the reference values to the values is performed using coordinate transformation.

In some embodiments, the method further comprises determining, based on the image, reference values corresponding to a position of another lane indicator relative to the vehicle.

In some embodiments, the method further comprises determining a proximity of the object to the lane indicator based on the values and the position information.

In some embodiments, the object is in a blind spot of the vehicle.

In some embodiments, the image represents a portion of the environment external to the vehicle that is within a field of view of the image capturing device and the position information indicates that the object is in a blind spot of the vehicle.

In some embodiments, the image is of a front view of the vehicle.

In some embodiments, a remote object detection system of a vehicle, comprises: a radar sensor configured to detect an object in an environment external to the vehicle; an image capturing device configured to capture an image representing an environment within a field of view of the image capturing device; a processor; and a memory that includes instructions that, when executed by the processor, cause the processor to: receive, from the image capturing device, the image, wherein the image is of a lane indicator corresponding to a lane of travel of the vehicle; determine, based on the image, reference values corresponding to a position of the lane indicator relative to the vehicle; associate each of the reference values to values used to locate a point within a reference frame related to a direction the vehicle is traveling; receive, from the radar sensor, position information of the object; determine, based on the values and the position information, an assigned lane of the object; detect an impending change of the lane of travel of the vehicle to the assigned lane of the object; generate a steering control value based on the impending change; and selectively control steering of the vehicle based on the steering control value.

In some embodiments, the instructions further cause the processor to associate each of the reference values to the values using coordinate transformation.

In some embodiments, the instructions further cause the processor to determine, based on the image, reference values corresponding to a position of another lane indicator relative to the vehicle.

In some embodiments, the instructions further cause the processor to determine a proximity of the object to the lane indicator based on the values and the position information.

In some embodiments, the object is in a blind spot of the vehicle.

In some embodiments, the radar sensor is further configured to track a number of times a signal is returned from an area in a predetermined distance of the vehicle; and the instructions further cause the processor to generate the steering control value based on the number of times the signal is returned and the predetermined distance.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations the systems, algorithms, methods, instructions, etc., described herein can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably.

As used herein, the term system can include a packaged functional hardware unit designed for use with other components, a set of instructions executable by a controller (e.g., a processor executing software or firmware), processing circuitry configured to perform a particular function, and a self-contained hardware or software component that interfaces with a larger system. For example, a system can include an application specific integrated circuit (ASIC), a Field Programmable Gate Array (FPGA), a circuit, digital logic circuit, an analog circuit, a combination of discrete circuits, gates, and other types of hardware or combination thereof. In other embodiments, a system can include memory that stores instructions executable by a controller to implement a feature of the system.

Further, in one aspect, for example, systems described herein can be implemented using a general-purpose computer or general-purpose processor with a computer program that, when executed, carries out any of the respective methods, algorithms, and/or instructions described herein. In addition, or alternatively, for example, a special purpose computer/processor can be utilized which can contain other hardware for carrying out any of the methods, algorithms, or instructions described herein.

Further, all or a portion of implementations of the present disclosure can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments, implementations, and aspects have been described in order to allow easy understanding of the present invention and do not limit the present invention. On the contrary, the invention is intended to cover various modifications and equivalent arrangements included within the scope of the appended claims, which scope is to be accorded the broadest interpretation to encompass all such modifications and equivalent structure as is permitted under the law.

What is claimed is:

1. A remote object detection system of a vehicle, comprising:
   a processor; and
   a memory that includes instructions that, when executed by the processor, cause the processor to:
      receive an image of a lane indicator in front of the vehicle from an image capturing device, the lane indicator corresponding to a lane of travel of the vehicle;
      determine, based on the image, reference values corresponding to a position of the lane indicator relative to the vehicle within a first reference frame, wherein the position of the lane indicator is on a side of or behind the vehicle;

associate each of the reference values to values within a second reference frame related to a direction the vehicle is traveling, wherein the values correspond to a position of the lane indicator on the side of or behind the vehicle that accounts for the direction the vehicle is traveling;

receive position information of an object in an environment external to the vehicle from a radar sensor;

determine, based on the values and the position information, an assigned lane of the object;

detect an impending change of the lane of travel of the vehicle to the assigned lane of the object;

generate a steering control value based on the impending change; and selectively control steering of the vehicle based on the steering control value.

2. The remote object detection system of claim 1, wherein the instructions further cause the processor to associate each of the reference values to the values using coordinate transformation.

3. The remote object detection system of claim 1, wherein the instructions further cause the processor to determine, based on the image, reference values corresponding to a position of another lane indicator relative to the vehicle.

4. The remote object detection system of claim 1, wherein the instructions further cause the processor to determine a proximity of the object to the lane indicator based on the values and the position information.

5. The remote object detection system of claim 1, wherein the object is in a blind spot of the vehicle.

6. The remote object detection system of claim 1, wherein the image represents a portion of the environment external to the vehicle that is within a field of view of the image capturing device and the position information indicates that the object is in a blind spot of the vehicle.

7. The remote object detection system of claim 6, wherein the image is of a front view of the vehicle.

8. A method for assisting steering of a vehicle in response to detecting an object in a proximity of the vehicle, comprising:

receiving an image of a lane indicator in front of the vehicle from an image capturing device, the lane indicator corresponding to a lane of travel of the vehicle;

determining, based on the image, reference values corresponding to a position of the lane indicator relative to the vehicle within a first reference frame, wherein the position of the lane indicator is on a side of or behind the vehicle;

associating each of the reference values to values within a second reference frame related to a direction the vehicle is traveling, wherein the values correspond to a position of the lane indicator on the side of or behind the vehicle that accounts for the direction the vehicle is traveling;

receiving position information of an object in an environment external to the vehicle from a radar sensor;

determining, based on the values and the position information, an assigned lane of the object;

detecting an impending change of the lane of travel of the vehicle to the assigned lane of the object;

generating a steering control value based on the impending change; and selectively controlling steering of the vehicle based on the steering control value.

9. The method of claim 8, wherein the associating each of the reference values to the values is performed using coordinate transformation.

10. The method of claim 8, further comprising determining, based on the image, reference values corresponding to a position of another lane indicator relative to the vehicle.

11. The method of claim 8, further comprising determining a proximity of the object to the lane indicator based on the values and the position information.

12. The method of claim 8, wherein the object is in a blind spot of the vehicle.

13. The method of claim 8, wherein the image represents a portion of the environment external to the vehicle that is within a field of view of the image capturing device and the position information indicates that the object is in a blind spot of the vehicle.

14. The method of claim 13, wherein the image is of a front view of the vehicle.

15. A remote object detection system of a vehicle, comprising:

a radar sensor configured to detect an object in an environment external to the vehicle;

an image capturing device configured to capture an image representing an environment within a field of view of the image capturing device;

a processor; and a memory that includes instructions that, when executed by the processor, cause the processor to:

receive, from the image capturing device, the image, wherein the image is of a lane indicator in front of the vehicle, the lane indicator corresponding to a lane of travel of the vehicle;

determine, based on the image, reference values corresponding to a position of the lane indicator relative to the vehicle within a first reference frame, wherein the position of the lane indicator is on a side of or behind the vehicle;

associate each of the reference values to values within a second reference frame related to a direction the vehicle is traveling, wherein the values correspond to a position of the lane indicator on the side of or behind the vehicle that accounts for the direction the vehicle is traveling;

receive, from the radar sensor, position information of the object;

determine, based on the values and the position information, an assigned lane of the object;

detect an impending change of the lane of travel of the vehicle to the assigned lane of the object;

generate a steering control value based on the impending change; and selectively control steering of the vehicle based on the steering control value.

16. The remote object detection system of claim 15, wherein the instructions further cause the processor to associate each of the reference values to the values using coordinate transformation.

17. The remote object detection system of claim 15, wherein the instructions further cause the processor to determine, based on the image, reference values corresponding to a position of another lane indicator relative to the vehicle.

18. The remote object detection system of claim 15, wherein the instructions further cause the processor to determine a proximity of the object to the lane indicator based on the values and the position information.

19. The remote object detection system of claim 15, wherein the object is in a blind spot of the vehicle.

20. The remote object detection system of claim 15, wherein:
the radar sensor is further configured to track a number of times a signal is returned from an area in a predetermined distance of the vehicle; and
the instructions further cause the processor to generate the steering control value based on the number of times the signal is returned and the predetermined distance.

* * * * *